United States Patent
Manley et al.

(10) Patent No.: US 10,617,137 B2
(45) Date of Patent: Apr. 14, 2020

(54) TREATMENT OF MEAT WITH CARBONATE SALT

(71) Applicant: Cargill, Incorporated, Wayzata, MN (US)

(72) Inventors: Joshua L. Manley, Springdale, AR (US); Lasika Shyamalie Senaratne-Lenagala, Wichita, KS (US); Todd Wills, Augusta, AR (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 16/062,349

(22) PCT Filed: Dec. 15, 2016

(86) PCT No.: PCT/US2016/066801
§ 371 (c)(1),
(2) Date: Jun. 14, 2018

(87) PCT Pub. No.: WO2017/106430
PCT Pub. Date: Jun. 22, 2017

(65) Prior Publication Data
US 2018/0360080 A1 Dec. 20, 2018

Related U.S. Application Data

(60) Provisional application No. 62/267,667, filed on Dec. 15, 2015.

(51) Int. Cl.
*A23L 13/40* (2016.01)
*A23L 13/70* (2016.01)
*C01B 32/60* (2017.01)

(52) U.S. Cl.
CPC .............. *A23L 13/432* (2016.08); *A23L 13/40* (2016.08); *A23L 13/72* (2016.08); *C01B 32/60* (2017.08)

(58) Field of Classification Search
CPC ........ A23L 13/40; A23L 13/72; A23L 13/432; C01B 32/60
See application file for complete search history.

(56) References Cited

U.S. PATENT DOCUMENTS

| | | | |
|---|---|---|---|
| 5,939,112 A * | 8/1999 | Katayama | A23B 4/023 426/302 |
| 7,378,119 B2 | 5/2008 | Eilert et al. | |
| 2010/0009048 A1 | 1/2010 | Hultin et al. | |
| 2011/0318458 A1 | 12/2011 | Topps | |

OTHER PUBLICATIONS

Mudalal, Samer, et al., "Comparison betweem the Quality Traits of Phosphate and Bicarbonate-Marinated Chicken Breast Fillets Cooked under Different Heat Treatments", Food and Nutrition Sciences, Jan. 2014, 35-44.
Senese, Fred, "What Happens when Sodium Bicarbonate is Heated", http:/antoine.frostburg.edu/chem/senese/101/inorganic/faq/carbonate-decomposition.shtml, Aug. 17, 2015, p. 1.

* cited by examiner

Primary Examiner — Anthony J Weier

(57) ABSTRACT

A method of providing a carbonate salt for treatment of meat, including providing a bicarbonate salt; heating the bicarbonate salt to convert the bicarbonate salt to a carbonate salt so that the bicarbonate salt is heated to a temperature of at least about 145° F. for a time until detectable production of $CO_2$ has ceased; and applying the carbonate salt to meat prior to cooking of the meat.

19 Claims, No Drawings

TREATMENT OF MEAT WITH CARBONATE SALT

CROSS REFERENCE TO RELATED APPLICATIONS

This application is a national phase application of PCT/US16/066801, filed 15 Dec. 2016, entitled PREPARATION OF CARBONATE SALT AND TREATMENT OF MEAT WITH SAME, which claims the benefit of priority to U.S. Provisional Application No. 62/267,667 filed 15 Dec. 2015, entitled PREPARATION OF CARBONATE SALT AND TREATMENT OF MEAT WITH SAME, which are hereby incorporated by reference in their entirety.

FIELD

The present invention relates to preparation of carbonate salt. More specifically, the present invention relates to preparation of carbonate salt and treatment of meat with the carbonate salt.

BACKGROUND

The pH of meat and meat products has a profound impact on quality characteristics. pH highly affects water holding capacity (WHC), which is closely related to product yields and sensory performance. Additionally, it influences color, shelf life, microbial growth, and textural attributes. WHC is the ability of meat to retain its water during processing, storage, and cooking. Low WHC often results in high drip loss and poor eating quality (dryer and tougher in the cooked state). Water loss contributes to a reduction in saleable product from reduced yields. Historically, phosphates have been added to meat products to improve product yield and performance partly through pH manipulation. Nearly all phosphates or blends of phosphates utilized in the meat processing industry are alkaline phosphates. The addition of an alkaline phosphate to muscle will cause an upward shift in the product pH away from the iso-electric point (pI). The pH movement away from the pI results in improved WHC because of greater electrostatic repulsive forces, which creates larger gaps between actin and myosin proteins, and greater amounts of water can be bound. The effectiveness and importance phosphates play in processed meat products are unquestionable; however, as consumers continue to seek more label friendly ingredients, it is desirable to identify suitable replacement materials for phosphate.

One consumer friendly additive used for treating meat is sodium bicarbonate. The method disclosed in U.S. Pat. No. 6,020,012 by Kauffman et al. utilizes a solution containing sodium bicarbonate, which is injected into pre-rigor carcasses as a means to limit pH decline of the meat. This is accomplished by mixing pure sodium bicarbonate into a solution with other common brine ingredients. The meat is then infused with said solution to improve the WHC, color, and organoleptic properties of fresh meat. Likewise, U.S. Pat. No. 7,378,119 to Eilert describes a fresh processed meat composition made from post-rigor meat and includes a bicarbonate additive.

U.S. Pat. No. 7,060,309 to Paterson et al., describe a process which overcomes some of the limitations when infusing meat products with sodium bicarbonate. Paterson describes infusing meat with a gas-releasing chemical such as sodium bicarbonate and applying vacuum before or after cooking to reduce appearance of holes in the meat after the meat has been cooked.

SUMMARY

The present invention provides an effective way to limit the negative effects of release of carbon dioxide from bicarbonate salts on product quality attributes of meat. It has been found that meat can be advantageously treated with a carbonate salt obtained from previously heat reacted sodium bicarbonate.

In an aspect of the present invention, a method of providing a carbonate salt for treatment of meat, comprises: a) providing a bicarbonate salt; b) heating the bicarbonate salt to convert the bicarbonate salt to a carbonate salt so the bicarbonate salt is heated to a temperature of at least about 145° F. for a time until detectable production of $CO_2$ has ceased; and c) applying the carbonate salt to meat prior to cooking of the meat.

In an aspect, the carbonate salt is incorporated into a brine solution, optionally with additional ingredients. This brine is added to meat in a manner that promotes uptake and/or distribution of the brine into the meat to provide an enhanced meat product. In an aspect, the meat is ground meat. In a preferred aspect, the meat is a whole meat cut.

Final enhanced meat products prepared containing the carbonate salt may exhibit superior performance as compared to other meat products with respect to one or more of the following properties: yield, structural integrity (e.g. demonstrated by better cohesive behavior when sliced), easier slicing, less purge of the brine solution before and/or after cooking, less sticking of encased meats to the casing, superior color, and having superior product appearance when cooked (e.g., reducing appearance of holes in the meat after the meat has been cooked).

DETAILED DESCRIPTION

The aspects of the present invention described below are not intended to be exhaustive or to limit the invention to the precise forms disclosed in the following detailed description. Rather a purpose of the aspects chosen and described is so that the appreciation and understanding by others skilled in the art of the principles and practices of the present invention can be facilitated.

In an aspect, the bicarbonate salt is a food grade bicarbonate salt. In an aspect, the bicarbonate salt is selected from the group consisting of sodium bicarbonate, potassium bicarbonate, calcium bicarbonate, and magnesium bicarbonate, or mixtures thereof. In an aspect the bicarbonate salt is selected from the group consisting of sodium bicarbonate or potassium bicarbonate or mixtures thereof. In an aspect, the bicarbonate salt is sodium bicarbonate. In an aspect, the bicarbonate salt is potassium bicarbonate. In an aspect, the bicarbonate salt is calcium bicarbonate.

In an aspect, the bicarbonate salt is provided in the form of a brine solution. In an aspect, the bicarbonate salt has a concentration in the brine solution of from about 0.1 molar to about 1.5 molar, or from about 0.8 to about 1.3 molar.

In an aspect, the concentration of bicarbonate salt in the brine solution is not above 10%, in order to maintain solubility during the conversion reaction and to avoid precipitation of bicarbonate salt once cooled.

In an aspect, the initial concentration of bicarbonate salt in the brine solution is from 6.35% to about 9.1%

In an aspect, the bicarbonate salt is provided in dry powder form.

As noted above, the bicarbonate salt is heated to convert the bicarbonate salt to a carbonate salt for a time until detectable production of $CO_2$ has ceased. The detection of production of $CO_2$ can be carried out by any method appropriate to the conditions of heating and the physical state of the bicarbonate salt. When the bicarbonate salt is heated when in the form of a brine solution, the production of $CO_2$ is detected in one aspect by observation of bubble formation in the bicarbonate salt brine solution.

When the bicarbonate salt is heated when in the dry form, the production of $CO_2$ is detected in an aspect by observation of gas evolution, or in another aspect by measurement of weight loss of the bicarbonate starting material.

In an aspect, the amount of time, temperature and conditions required for conversion of the bicarbonate salt to a carbonate salt until detectable production of $CO_2$ has ceased can be developed as a production protocol, so that there is no need to actively measure production of $CO_2$ as part of the method of the present invention. In another aspect, determination of the point at which detectable production of $CO_2$ has ceased is actively measured during the heating step.

In an aspect, a dry bicarbonate salt or a sodium bicarbonate brine solution is heated to a temperature that is as high or higher than the projected appropriate temperature that the final meat product will reach during cooking. For example, USDA guidelines indicate that Beef, Pork, Veal & Lamb should be cooked to a Minimum Internal Temperature of 145° F. (62.8° C.), and poultry should be cooked to a Minimum Internal Temperature of 165° F. (73.9° C.).

In an aspect, the bicarbonate salt that is provided in brine solution form is heated to a temperature of from about 145° F. to about 212° F. In an aspect, the bicarbonate salt is heated to a temperature of from about 165° F. to about 212° F. In an aspect, the bicarbonate salt is heated to a temperature of from about 185° F. to about 212° F. In an aspect, the bicarbonate salt is heated to a temperature of from about 195° F. to about 212° F. In an aspect, the bicarbonate salt is heated to a temperature of from about 200° F. to about 212° F.

In an aspect, the bicarbonate salt that is provided in dry form is heated to a temperature of from about 145° F. to about 600° F. In an aspect, the bicarbonate salt is heated to a temperature of from about 165° F. to about 500° F. In an aspect, the bicarbonate salt is heated to a temperature of from about 185° F. to about 450° F. In an aspect, the bicarbonate salt is heated to a temperature of from about 195° F. to about 400° F. In an aspect, the bicarbonate salt is heated to a temperature of from about 200° F. to about 350° F.

In an aspect, the bicarbonate salt provided in brine solution is heated to the temperature for a time of from about 20 to about 135 minutes. In an aspect, the bicarbonate salt provided in brine solution is heated to the temperature for a time of from about 40 to about 60 minutes.

In an aspect, the bicarbonate salt is heated in a brine solution with agitation. This aspect is particularly advantageous to facilitate escape of $CO_2$ gas from the brine solution. It has been found that gas may remain in the brine solution if the water is not agitated. Agitation facilitates release of gas by exposure of liquid surface to air and or by disrupting the surface tension of the brine solution. Agitation may be carried out by any appropriate stirring or mixing element as will be now understood by the skilled artisan.

In an aspect, the bicarbonate salt provided in dry form is heated to the temperature for a time of from about 10 to about 75 minutes. In an aspect, the bicarbonate salt provided in dry form is heated to the temperature for a time of from about 30 to about 45 minutes.

In an aspect, the bicarbonate salt is heated in dry form with agitation. This aspect is particularly advantageous to facilitate complete heating of the dry bicarbonate salt. In some aspects, agitation additionally prevents blocking of the salt. Advantageously, large chunks or solid regions of the resulting carbonate salt are not formed that would require breaking up prior to use. Agitation may be carried out by any appropriate stirring or mixing element as will be now understood by the skilled artisan.

In an aspect, the bicarbonate salt is heated under conditions to convert the bicarbonate salt to a carbonate salt such that no detectable $CO_2$ is evolved during cooking of the meat. In an aspect, the bicarbonate salt is heated under conditions for complete conversion of the bicarbonate salt to a carbonate salt.

Advantageously, the carbonate salt is in an aspect prepared in close physical proximity to the site of meat treatment for convenience in material availability and to assure that the carbonate salt is properly stored and handled so that it does not re-convert to the bicarbonate salt. For purposes of the present invention, "close physical proximity" is less than 4 hours transportation time from carbonate salt preparation to the site of meat treatment.

In an aspect, the carbonate salt has a concentration in the brine solution of from about 0.05 molar to about 1.5 molar when applied to the meat. In an aspect, the carbonate salt has a concentration in the brine solution of from about 0.5 molar to about 1.5 molar when applied to the meat.

In an aspect, the brine solution containing the carbonate salt may also include a variety of optional additives. (For purposes of the present invention, a solution comprising a carbonate salt or a bicarbonate salt is by definition considered a brine solution, which may optionally be enhanced by addition of additives.) Examples of suitable additives may include salts, binders, synthetic antioxidants, natural antioxidants such as rosemary, spices, flavoring agents, and antimicrobials (e.g. bacterial and other pathogen inhibitors such as sodium or potassium lactate, diacetates, vinegars, cultured sugar). In an aspect, the brine solution comprises natural antibacterial agents as defined by the USDA, such as vinegar, lemon juice, sea salt, and blends thereof (such as MOstatin™ LV1Xm an all natural blend of vinegar and lemon juice from World Technology Ingredients in Jefferson, Ga.). The antibacterial agents may also be buffered, such as MOstatin™ V (buffered vinegar), or formulated for low sodium, such as MOstatin™ VLS (low sodium vinegar), both also from World Technology Ingredients in Jefferson, Ga. In an aspect, the brine solution containing the carbonate salt may also comprise protein, such a protein from animal or vegetable sources. In an aspect, the brine solution containing the carbonate salt may also comprise protein from a nut source. In an aspect, the brine solution is in the form of an emulsion. In an aspect, the brine solution containing the carbonate salt comprises salt. In an aspect, the brine solution containing the carbonate salt comprises acid.

In an aspect, the brine solution has a pH of from about 6.5 to about 9.5 prior to being added to the meat portion. In an aspect, the brine solution has a pH of from about 7 to about 9 prior to being added to the meat portion. In an aspect, the brine solution has a pH of from about 7.5 to about 8.5 prior to being added to the meat portion.

In an aspect, the brine solution has a table salt content of from about 1% wt to about 10% wt prior to being added to the meat portion. In an aspect, the brine solution has a table salt content of from about 2% wt to about 6% wt, or from about 3% wt to about 5% wt, prior to being added to the meat portion. In an aspect, the brine solution has an ionic strength of from about 0.2M to about 4M prior to being added to the meat portion. In an aspect, the brine solution has an ionic strength of from about 1M to about 3M prior to being added to the meat portion. For purposes of the present invention, a table salt is a salt selected from sodium chloride, potassium chloride and magnesium chloride and mixtures thereof. The table salt may be provided as purified salt, or may be provided in a technically impure form such as a sea salt or other natural sourced salt. In an aspect, the salt is an iodized salt. It has been found that brine solutions comprising table salt are particularly advantageous in increasing water holding capacity and binding property in a manner that additionally provides organoleptic benefit.

The meat to be treated in accordance with the present invention may be any variety of meat from any species. Suitable meats include those obtained from bovine, porcine, equine, caprine, ovine, avian animals, or any animal commonly slaughtered for food production. Bovine animals may include, but are not limited to, buffalo, and all cattle, including steers, heifers, cows, and bulls. Porcine animals may include, but are not limited to, feeder pigs and breeding pigs, including sows, gilts, barrows, and boars. Ovine animals may include, but are not limited to, sheep, including ewes, rams, wethers, and lambs. Poultry may include, but are not limited to, chicken, turkey, and ostrich. In a preferred aspect, the meat to be treated is beef, pork, turkey or chicken.

The meat may be provided as a whole meat cut in any suitable cut or portion, including whole carcasses (especially poultry), primals (hams), sub-primals, steaks, and irregular cuts. In a particularly preferred aspect, the meat is provided in a cut steak portion. In an aspect, the meat is in the form of intact muscle tissue portions of at least 1 oz (28 g), or in muscle tissue portions of at least 3 oz (85 g), or in muscle tissue portions of from about 1 oz (28 g) to about 3 lbs (1.4 kg), or in muscle tissue portions of from about 3 oz (85 g) to about 2 lbs (0.9 kg).

In an aspect, the meat is in the form of ground meat.

In an aspect, the brine solution is injected into a meat portion using any suitable injection equipment, including but not limited to equipment manufactured by Wolf-Tech, Kingston, N.Y. This equipment generally draws the brine solution from a tank and delivers it using pressure through needles to the meat portion. An example of a commercially available brine injector/pump is the Schroder IMAX 630 available from Wolf-Tech, Kingston, N.Y. Another example of an injector system is the Stork/Townsend 1400 injector. The injector equipment is selected so that the brine solution can pass through the injection needles without physically plugging the equipment.

In an aspect, the meat portion is physically manipulated in a manner that causes uptake of the brine solution into the meat portion. In an aspect, this mixing is carried out by causing the meat portion to be tumbled, kneaded, massaged or otherwise manipulated in the presence of the brine solution to cause uptake of the brine solution into the meat portion.

In an aspect, the meat portion is vacuum tumbled in the presence of the brine solution at a vacuum of from about 100 Torr to about 20 Torr and for a time of from about 5 to about 60 minutes, or of from about 10 to about 40 minutes, of from about 10 to about 30 minutes. Vacuum tumbling advantageously promotes rapid uptake of brine solution into the meat portion, and preferably improves the overall distribution of the brine solution in the meat portion. Vacuum tumblers are commercially available, such as from Koch Equipment of Kansas City, Mo., or Horizon Bradco of Schenectady, N.Y.

In an aspect, the brine solution is injected into a meat portion using any suitable injection equipment, followed by physical manipulation of the meat portion in a manner that promotes uptake and/or distribution of the brine solution into the meat portion. The physical manipulation is in an aspect carried out by causing the meat portion to be tumbled, kneaded, massaged or otherwise manipulated, optionally under vacuum as discussed above.

In an aspect, the final enhanced muscle portion is in the form of an encased meat such as a sausage. In an aspect, the final enhanced muscle portion is in the form of an encased meat that is a combination of a plurality of whole muscle meat portions provided as a slicing log. In an aspect, the slicing log is a combination of a plurality of whole muscle meat portions and ground meat. In an aspect, the slicing log is a combination of a ground meat portions. In an aspect, the slicing logs are cooked prior to slicing.

In an aspect of the present invention, an enhanced meat portion prepared by the processes as described herein is provided as an uncooked or partially cooked product (i.e. requiring further heating by a customer for safe consumption). In an aspect of the present invention, an enhanced meat portion prepared by the processes as described herein is provided as a cooked product (i.e. requiring no further heating by a customer for safe consumption, but of course which may optionally be heated by the customer according to other organoleptic considerations).

In an aspect of the present invention, an enhanced meat portion prepared by the processes as described herein is provided as a wholesale or retail product. In an aspect, one or more enhanced meat portions are packaged for bulk sale in the wholesale market or for institutional sale.

EXAMPLES

Representative aspects of the present invention will now be described with reference to the following examples that illustrate the principles and practice of the present invention.

Example 1. Conversion Sodium Bicarbonate to Sodium Carbonate 4 wt % Solution 40 grams of sodium bicarbonate powder was added to 960 grams of room temperature water after which heat was applied until boiling point of water was reached. The brine solution was whisked until no more bicarbonate was seen pooling in the bottom of the pan. Heat was turned to medium/high until mixture started aggressively gassing off, heat was then turned down to medium for a period of ten minutes.
Observations:
Heating
   Bicarbonate ring left at the original water line unreacted
   No Bicarbonate scale on top of the water
   Bicarbonate residue left on all pan contact surfaces
   Transferred and covered after two minutes
Chilling
   Minimal solids left in the bottom of the holding container
   Contact surface scaling not present on container
   Remains stable after more than 36 hours
PH—8.56
Final weight—924 g
Comments: After one week, sodium carbonate was still in solution. The initial concentration of sodium bicarbonate can be higher than the 4% concentration of this example.

Example 2. Conversion Sodium Bicarbonate to Sodium Carbonate 8 wt % Solution 80 grams of sodium bicarbonate powder was added to 920 grams of room temperature water after which heat was applied until boiling point of water was reached. The brine solution was whisked until no more sodium bicarbonate was seen settling to the bottom of the pan. Heat was turned to medium/high until mixture started aggressively gassing off, heat was then turned down to medium for a period of ten minutes.

Observations:
Heating
   Bicarbonate ring left at the original water line unreacted
   Minimal Bicarbonate scale on top of the water
   Bicarbonate residue left on all pan contact surfaces
   Transferred and covered after two minutes
Chilling
   Minimal solids left in the bottom of the holding container
   Contact surface scaling not present on container
   Remains stable after more than 36 hours
PH—8.59
Final weight—912 g Comments: After one week, sodium carbonate was still in solution. The initial concentration of sodium bicarbonate can be higher than the 8% concentration of this example.

Example 3. Conversion Sodium Bicarbonate to Sodium Carbonate 16 wt % Solution 160 grams of sodium bicarbonate powder was added to 840 grams of room temperature water after which the solution was heated and stabilized for 3 minutes at various heat ranges before continuing to the boiling point. The solution was whisked from time to time during heating to minimize sodium bicarbonate settlement.

Observations:
Heating
78° F.—initial reaction of sodium bicarbonate begins and dissipates quickly
130° F.—reactions become more aggressive but dissipate after two minutes
150° F.—sodium bicarbonate begins aggressively reacting again that is sustained through ten minutes; large bubbles formed from smaller bubbles, more heat applied once process shows signs of slowing down
170° F.—sodium bicarbonate begins aggressively reacting again that is sustained through ten minutes; large bubbles formed from smaller bubbles, more heat applied once process shows signs of slowing down
210° F.—sodium bicarbonate brine solution maintained at 210° F. for ten minutes, minimal material reaction at that point.
   Bicarbonate ring left at the original water line unreacted
   Minimal Bicarbonate scale on top of the water
   Bicarbonate residue left on all pan contact surfaces
   Transferred and covered after two minutes
Chilling
   Minimal solids left in the bottom of the holding container
   Contact surface scaling not present on container
   Remains stable after 24 hours
   Brine solution was cloudy for the first 24 hours
   At 36 hours scaling of contact surface present and solids begin forming in the bottom of the container
PH—9.21
Final weight—549 g Comments: In this example, the sodium bicarbonate brine solution has reached its saturation point. Upon cooling, carbonate precipitated out of solution and settled on bottom of container. It is believed that this can be avoided if water is first heated to desired temperature, and then sodium bicarbonate is added to the water to assure complete dissolution.

Example 4. Conversion of Sodium Bicarbonate (NaHCO$_3$) to Sodium Carbonate (Na$_2$CO$_3$)—Dry—Stove Method a) Preparation of Na$_2$CO$_3$ Powder;
A box (1.81 kg) of pure baking soda (sodium bicarbonate) was purchased from a commercial retailer.
200 g of NaHCO$_3$ was weighed into a pre-weighed plastic container.
After heating a stainless steel pan (around 65° C.) on a regular electrical kitchen stove, NaHCO$_3$ was added into it and stirred continuously.
Heating and constant stirring were continued till evaporation of water and carbon dioxide emission could no longer be observed.
Final weight of the powder was measured.
Trial was repeated twice.
Sodium bicarbonate was very fine white powder. At about 60-70° C., water vapor and carbon dioxide gas started escaping from the NaHCO$_3$ powder. When NaHCO$_3$ powder was heated up to 130° C. with continuous stirring, water vapor and carbon dioxide gas vigorously escaped from the powder. Time required to gas off carbon dioxide and to evaporate water totally from NaHCO$_3$ powder in both trials was 8 minutes. Final weight of Na$_2$CO$_3$ made in the container in both trials was 125 g each. It was 62.5% of its (NaHCO$_3$) initial weight (See the Calculation below). The texture of Na$_2$CO$_3$ powder made was grainier than NaHCO$_3$ powder.

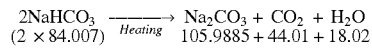

$$\underset{(2 \times 84.007)}{2NaHCO_3} \xrightarrow{Heating} \underset{105.9885 + 44.01 + 18.02}{Na_2CO_3 + CO_2 + H_2O}$$

Based on balanced reaction equation above;

$$\% \text{ of } Na_2CO_3 = \frac{105.9885}{168.014} \times 100$$

$$= \underline{63.08\%}$$

Based on both trials;

Initial weight of NaHCO$_3$ = 200 g

Weight of Na$_2$CO$_3$ gassing off CO$_2$ and water = 125 g $$\% \text{ of } Na_2CO_3 = \frac{125}{200} \times 100$$

$$= \underline{62.5\%}$$

MW of NaHCO$_3$ = 84.007 g/mole

MW of Na$_2$CO$_3$ = 105.9885 g/mole

MW of CO$_2$ = 44.01 g/mole

MW of CO$_2$ = 18.02 g/mole b) Making Na$_2$CO$_3$ Aqueous Brine Solution;
Weight percentage Na$_2$CO$_3$ aqueous brine solutions (10, 15, 20, 25, 30, 35, and 40%) were prepared by dissolving Na$_2$CO$_3$ powder (prepared in the previous step) in water (~25° C.). Total volume of each concentration brine solutions was 100 g.

% Brix and pH of each brine solution were measured using a Refractometer and a digital pH meter, respectively.

All the aqueous $Na_2CO_3$ brine solutions were made with ~25° C. water. Table 1 presents the properties of different weight % $Na_2CO_3$ brine solutions.

TABLE 1

Properties of Na2CO3 aqueous brine solutions.

| $Na_2CO_3$ solution | Appearance | [1]% Brix at Room temperature (25° C.) | [2]pH at room temperature (25° C.) |
|---|---|---|---|
| 10% | Clear | 14.8 | 10.73 |
| 15% | Slightly particulate | 21.4 | 10.87 |
| 20% | Slightly particulate | 27.2 | 10.89 |
| 25% | Slightly particulate | >30 | 10.80 |
| 30% | Crystalized precipitate | Difficult to read as FR meter max was 32% | 10.70 |
| 40% | Rapidly crystalized | Difficult to read | Difficult to read |

[1]Refractormeter scale was only 0-32%
[2]Prepared Na2CO3 brine solutions were highly alkaline; however, the calibration buffers we had were pH 4 and 7 only.

Comments: $NaHCO_3$ powder is easily converted to $Na_2CO_3$ by direct heating (60-130°) and continuous stirring. Dry heating does not affect color of the final powder. Total time needed for the conversion under these conditions is 8 minutes. Prepared $Na_2CO_3$ can be directly added to brine to increase pH without diluting the brine (no water inclusion is needed for the process).

Example 4. Conversion of Sodium Bicarbonate ($NaHCO_3$) to Sodium Carbonate ($Na_2CO_3$)—Dry—Oven Method The oven (Rational™ Combination oven) was set for dry air at 550° F. temperature with low air circulation (fan). A stainless-steel tray containing 7 lbs. of sodium bicarbonate (about 1.5" thick layer) was placed in the oven. After 60 min, the tray was weighed (weight was 4.42 lb.). The tray was placed again in the oven. After 30 min, the tray was re-weighed (weight of the tray was 4.41 lb.).

Results & Discussion:

During heating, carbon dioxide gas and water vapor escaped from sodium bicarbonate leaving sodium carbonate powder in the tray. Total time needed to complete the reaction was 60 min at 550° F.

$$2NaHCO_3 \longrightarrow Na_2CO_3 + CO_2 + H_2O$$
$$(2 \times 84.007) \quad 105.9885 + 44.01 + 18.02$$

MW of $NaHCO_3$ = 84.007 g/mole

MW of $Na_2CO_3$ = 105.9885 g/mole

MW of $CO_2$ = 44.01 g/mole

MW of $CO_2$ = 18.02 g/mole

Conversion of $NaHCO_3$ to $Na_2CO_3$ in % = $\frac{4.41}{7} \times 100 = 63.1\%$ (Based on test)

6.25% solution (wt./wt.) was made by dissolving the powder (sodium carbonate) that remained in the tray in chilled R/O water. pH of the 6.25% solution was 11.34 which is similar to the pH of 6.25% solution made by dissolving commercially available sodium carbonate powder in R/O water.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the aspect of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various aspects, any of the terms "comprising", "consisting essentially of" and "consisting of" used in the description of an aspect may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of providing a carbonate salt for treatment of meat, comprising:
   a) providing a bicarbonate salt;
   b) heating the bicarbonate salt to convert the bicarbonate salt to a carbonate salt so that the bicarbonate salt is heated to a temperature of at least about 145° F. for a time until detectable production of $CO_2$ has ceased; and
   c) applying the carbonate salt to meat prior to cooking of the meat.

2. The method of claim 1, wherein the bicarbonate salt is mixed with water to form a bicarbonate salt brine solution prior to the heating step.

3. The method of claim 2, wherein the production of $CO_2$ is detected during the heating step by observation of bubble formation in the bicarbonate salt brine solution.

4. The method of claim 2, wherein the bicarbonate salt is heated to a temperature of from about 145° F. to about 212° F.

5. The method of claim 2, wherein the bicarbonate salt is heated to the temperature for a time of from about 20 to about 135 minutes.

6. The method of claim 2, wherein the bicarbonate salt is heated to the temperature for a time of from about 40 to about 60 minutes.

7. The method of claim 2, wherein the bicarbonate salt is heated in a brine solution with agitation.

8. The method of claim 1, wherein the heating step is carried out on the bicarbonate salt when in the dry state.

9. The method of claim 8, wherein the bicarbonate salt is heated to a temperature of from about 145° F. to about 600° F.

10. The method of claim 8, wherein the bicarbonate salt is heated to the temperature for a time of from about 10 to about 75 minutes.

11. The method of claim 8, wherein the bicarbonate salt is heated to the temperature for a time of from about 30 to about 45 minutes.

12. The method of claim 8, wherein the bicarbonate salt is heated in dry form with agitation.

13. The method of claim 8, wherein the carbonate salt is mixed with water to form a carbonate salt brine solution prior to the application to the meat.

14. The method of claim 1, wherein the carbonate salt is applied to meat from a brine solution having a carbonate salt concentration of between about 0.1 molar and 1.5 molar.

15. The method of claim 1, wherein the bicarbonate salt is selected from the group consisting of sodium bicarbonate, potassium bicarbonate, calcium bicarbonate, and magnesium bicarbonate, or mixtures thereof.

16. The method of claim 1, wherein the bicarbonate salt is selected from the group consisting of sodium bicarbonate or potassium bicarbonate or mixtures thereof.

17. The method of claim 13, wherein the carbonate salt is applied to meat from a brine solution having a carbonate salt concentration of between about 0.1 molar and 1.5 molar.

18. The method of claim 2, wherein the bicarbonate salt is heated to a temperature of from about 195° F. to about 212° F.

19. The method of claim 8, wherein the bicarbonate salt is heated to a temperature of from about 195° F. to about 400° F.

* * * * *